US008147262B1

(12) United States Patent
Su et al.

(10) Patent No.: US 8,147,262 B1
(45) Date of Patent: Apr. 3, 2012

(54) CARD CONNECTOR

(75) Inventors: Yu-Hung Su, New Taipei (TW);
Yao-Ting Wang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/214,187

(22) Filed: Aug. 20, 2011

(51) Int. Cl.
*H01R 13/62* (2006.01)

(52) U.S. Cl. .......................................... 439/159; 439/630

(58) Field of Classification Search .................. 439/159, 439/630, 945, 946
See application file for complete search history.

(56) References Cited

U.S. PATENT DOCUMENTS

| 2005/0003711 | A1* | 1/2005 | Chang | 439/630 |
| 2009/0023319 | A1* | 1/2009 | Hou et al. | 439/159 |

* cited by examiner

*Primary Examiner* — Tho D Ta
(74) *Attorney, Agent, or Firm* — Cheng-Ju Chiang

(57) ABSTRACT

Disclosed is a card connector, which includes an insulative body, a plurality of the conductive terminals, a metal shell and a supporting plate. The insulative body has a main body in which a plurality of terminal slots is defined. The conductive terminals are respectively received in the terminal slot. The metal shell covers the insulative body and defines a receiving space therebetween. The supporting plate is movably disposed in the receiving space. The supporting plate has a swingable connecting portion. The front substrate can swing up and down relative to the rear substrate through the design of the supporting plate and the swingable connecting portion, so that the electronic card can be easily inserted into and ejected from the card connector without being damaged, thereby prolong the service life of the electronic card.

5 Claims, 6 Drawing Sheets

CARD CONNECTOR

FIELD OF THE INVENTION

The present invention relates to a connector, and especially to a card connector.

BACKGROUND OF THE INVENTION

With the rapid development of information technology, mobile phones and other personal communication devices are being widely used. An electronic card that is used for a user's identification is mainly through the card connector for electrically coupling to a circuit board of the mobile phone.

A conventional card connector includes a metal shell, an insulative body, a plurality of conductive terminals, and so on. After the electronic card is directly inserted into a receiving space which is formed between the metal shell and the insulative body, the electronic card connects with the conductive terminals, so that an electrical connection between the electronic card and the circuit board is realized.

However, the above-mentioned card connector is not convenient for the electronic card to be inserted thereto, and the electronic card is easily damaged by inserting and ejecting from the metal shell, thus reducing the service life of the electronic card.

SUMMARY OF THE INVENTION

An objective of the present invention is to provide a card connector for an electronic card which can easily be inserted into and ejected from the card connector without damage, thereby prolong the service life of the electronic card.

To achieve the foregoing objectives, the present invention provides a card connector which includes an insulative body, a plurality of conductive terminals, a metal shell and a supporting plate. The insulative body has a main body, and a plurality of terminal slot is defined in the main body. The plurality of conductive terminals is respectively received in the terminal slot. The metal shell covers the insulative body, and a receiving space is defined between the metal shell and the insulative body. The metal shell has a shield plate, and an elastic sheet is disposed on the shield plate. An end of the elastic sheet bends downwards and extends obliquely upward to form an engage portion. The supporting plate is movably disposed in the receiving space of the insulative body. The supporting plate has a substrate which includes a front substrate; a rear substrate, a swingable connecting portion, which is coupled to the front substrate and the rear substrate, and a handheld portion, which extends from a front end of the front substrate. A base slot is defined in a middle of an upper surface of the front substrate, and a connecting slot which penetrates the substrate is defined in a middle of the base slot. A holding groove is disposed on the rear substrate, and the engage portion of the elastic sheet is capable of engaging with the holding groove.

According to the above mentioned, the front substrate can swing up and down relative to the rear substrate through the design of the supporting plate and the swingable connecting portion, so that the electronic card can easily be inserted into and ejected from the card connector without damage, thereby prolong the service life of the electronic card.

DETAILED DESCRIPTION OF THE PREFERRED EMBODIMENTS

References will now be made in detail to a preferred embodiment of the invention, examples of which are illustrated in the accompanying drawings.

Figure 1:
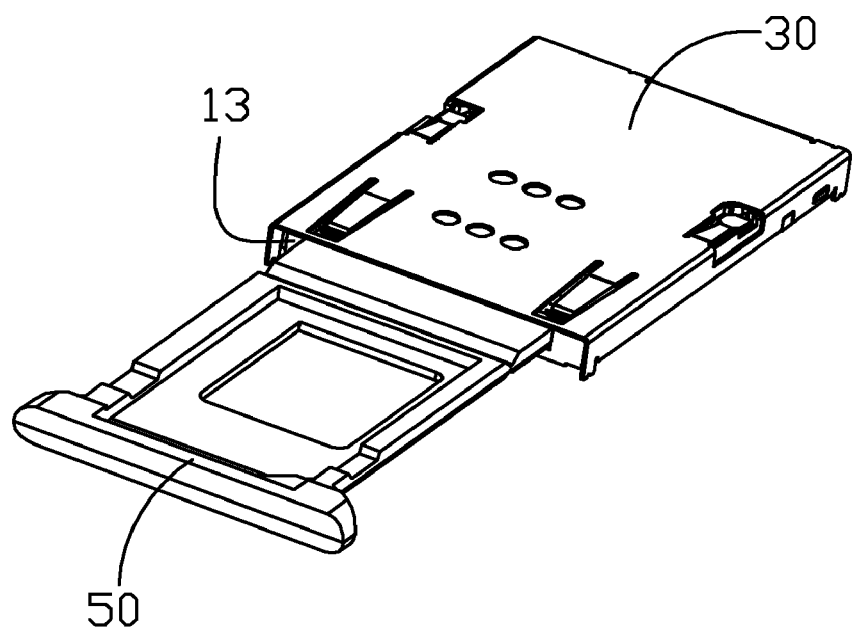
FIG. 1 is a perspective view illustrating a card connector according to the present invention.
Figure 2:
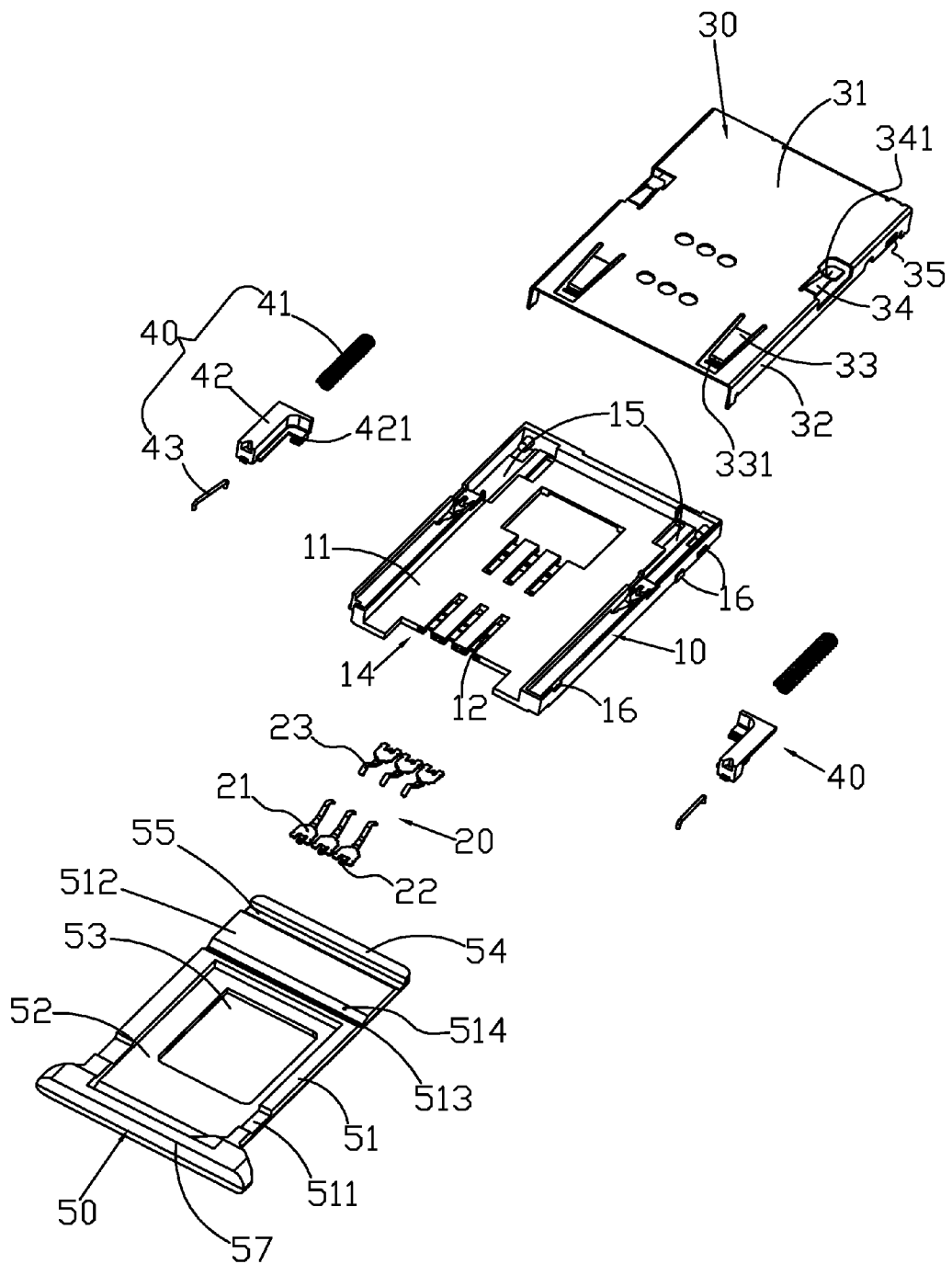
FIG. 2 is an exploded view illustrating the card connector of FIG. 1.
Figure 3:
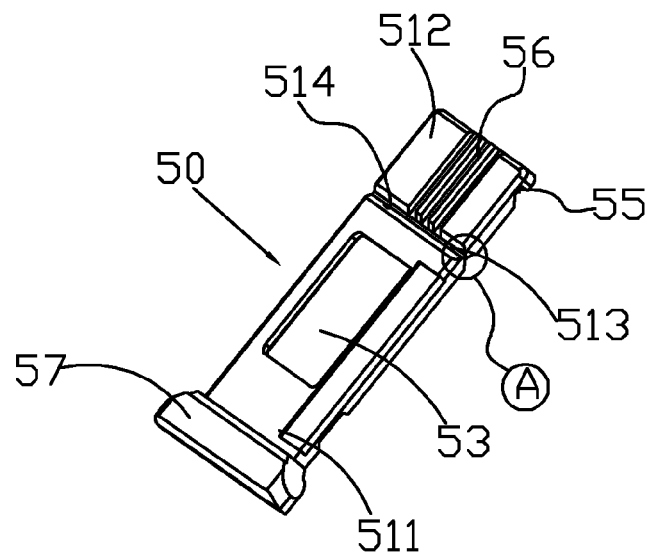
FIG. 3 is a perspective view illustrating a supporting plate of the card connector of FIG. 2.

Referring to FIG. 1 and FIG. 2, the card connector 1 of the present invention includes an insulative body 10, a plurality of conductive terminals 20, a metal shell 30, two card ejection mechanisms 40 and a supporting plate 50.

Figure 5:
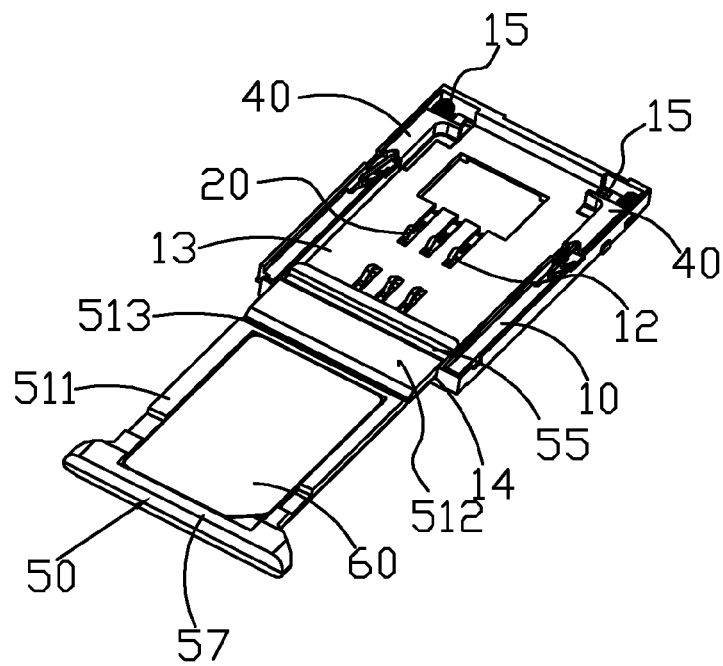
FIG. 5 is a partial schematic drawing illustrating the card connector of FIG. 1.
Figure 6:
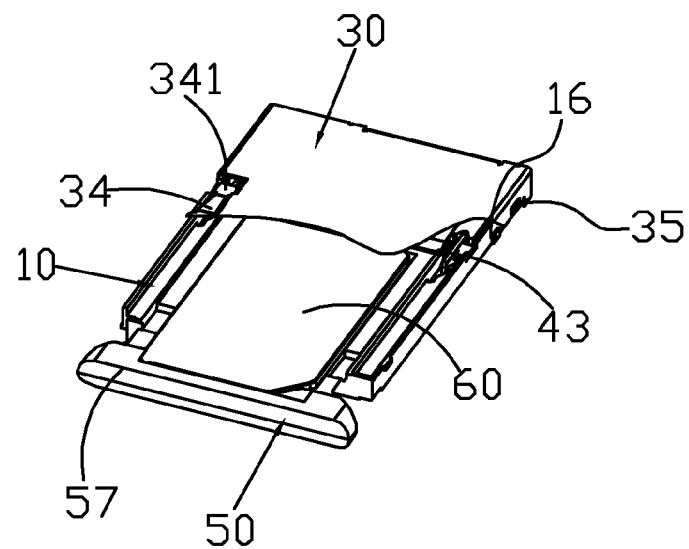
FIG. 6 is a schematic drawing illustrating the card connector assembly of FIG. 1.

Referring to FIG. 2 and FIG. 5, the insulative body 10 has a main body 11 being a rectangle block shape. A plurality of terminal slots 12, which penetrate the main body 11, is defined in the main body 11. A metal shell 30 covers the insulative body 10, and a receiving space 13 is defined between the metal shell and the insulative body for containing the supporting plate 50. The terminal slots 12 and the receiving space 13 are interconnected, and an opening of the receiving space 13 forms a socket 14 for inserting the supporting plate 50. Two receiving recesses 15 are respectively defined in right and left sides of a back of the insulative body 10, and two card ejection mechanisms 40 are slidably disposed in two receiving recesses 15, respectively. A plurality of fixture blocks 16 is convexly disposed in right, left, and back sides of the main body 11.

Figure 4:
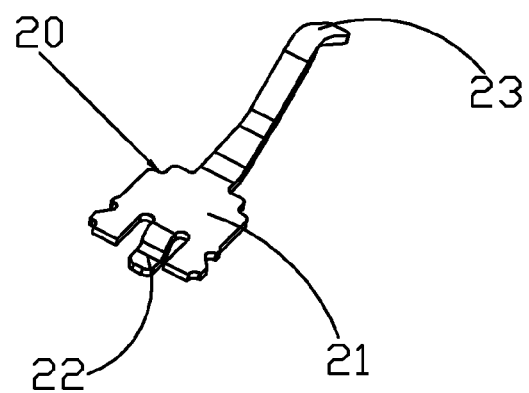
FIG. 4 is a perspective view illustrating a conductive terminal of the card connector of FIG. 2.

Referring to FIG. 2, FIG. 4 and FIG. 5, the conductive terminals 20 are respectively received in the terminal slots 12. Each conductive terminal 20 includes a base portion 21. One side of the base portion 21 extends and bends toward the lower surface of the insulative body 10 to form an end welding portion 22, and the end welding portion 22 is utilized to weld a corresponding electrical contact of a printed circuit board (not shown). Another side of the base portion 21 extends and bends toward the upper surface of the insulative body 10 to form a curved contacting portion 23, whereby the contacting portion 23 is utilized to electrically couple with the electronic card 60.

Figure 7:
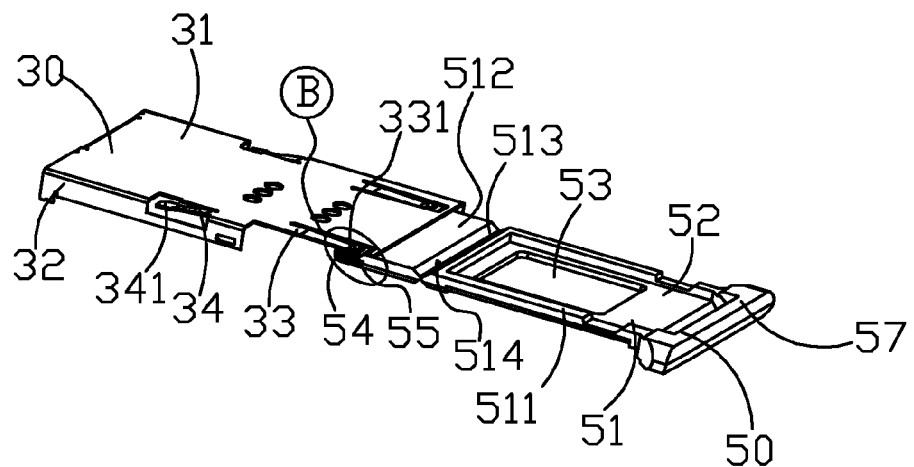
FIG. 7 is a schematic drawing illustrating a fastening of a metal shell and the supporting plate of the card connector of FIG. 2.
Figure 8:
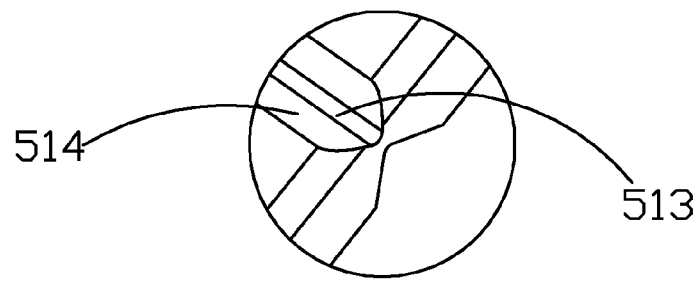
FIG. 8 is a detail with enlarged scale illustrating "A" of FIG. 3.

Referring to FIG. 1, FIG. 2, and FIG. 7, the metal shell 30 covers the insulative body 10, and the metal shell 30 has a shield plate 31 as well as two side plates 32 which extend and bend downward to form the shield plates 31. Two elastic sheets 33 are respectively disposed in right and left sides of a front of the shield plate 31. A front part of the elastic sheet 33 bends downward and extends obliquely upward to form an engage portion 331. Two battens 34 are respectively disposed in right and left sides of a middle of the shield plate 31. A pressing sheet 341 is disposed in a back end of the batten 34. A plurality of the fixing slots 35 is defined in two side plates 32 and a back side plate.

Referring to FIG. 2, the card ejection mechanism 40 includes an elastic element 41, a slide block 42, and a guiding pin 43. A resistant portion 421 is convexly extended from a back side of the slide block 42, and the card ejection mechanism 40 is slidably disposed in the receiving recess 15.

Referring to FIG. 2, FIG. 3, FIG. 5, FIG. 7, FIG. 8, and FIG. 9, the supporting plate 50 has a substrate 51. The substrate 51 includes a front substrate 511, a rear substrate 512, and a swingable connecting portion 513, which is disposed between the front substrate 511 and the rear substrate 512. Guiding inclines 514, which are two chamfers, are disposed longitudinal symmetrically on the swingable connecting portion 513, the connection between the front substrate 511, and the rear substrate 512. A base slot 52 is defined in a middle of the upper surface of the front substrate 511, and a connecting slot 53 which penetrates the front substrate 511 is defined in a middle of the base slot 52. A pressing portion 54 is defined in one end of the rear substrate 512. A holding groove 55 which penetrates the supporting plate 50 is defined on a front wall of the pressing portion 54. A lower surface of the rear substrate 512 sinks for forming a plurality of leading portions 56, the leading portions 56 penetrate the lower surface of the rear substrate 512 from the swingable connecting portion 513 to the pressing portion 54. A handheld portion 57 extends from a front end of the front substrate 511.

Figure 9:
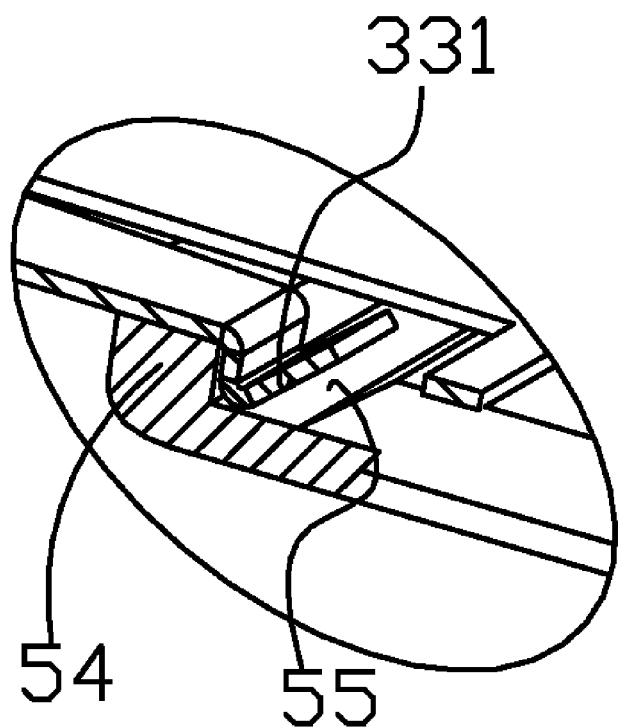
FIG. 9 is a detail with enlarged scale illustrating "B" of FIG. 7.

Referring to FIG. 4, FIG. 5, FIG. 6, FIG. 7, and FIG. 9, when assembling the card connector 1 of the present invention, the two card ejection mechanisms 40 are slidably disposed in the two recesses 15, and the plurality of conductive terminals 20 is received in the plurality of terminal slots 12, also the end welding portion 22 protrudes out of the insulative body 10. The supporting plate 50 is movably inserted to the receiving space 13 along the socket 14, and the base portion 21 is placed on the leading portion 56. Then the metal shell 30 is disposed in the insulative body 10, and the fixture block 16 is engaged with the fixing slot 35. Moreover, the pressing sheet 341 of the batten 34 is pushed against the guiding pin 43, and the engage portion 331 of the elastic sheet 33 is engaged with the holding groove 55 (as shown in FIG. 9), thereby realizing the assembly of the card connector of the present invention.

The front substrate 511 can swing up and down relative to the rear substrate 512 through the design of the swingable connecting portion 513, so that the electronic card 60 can easily be received in the base slot 52. Then the handheld portion 57 is pushed for making the supporting plate 50 to move along the socket 14 into the receiving space 13 till the pressing portion 54 pushing against the two resistant portions 421. Meanwhile, the contacting portions 23 of the conductive terminals 20 slide along the leading portion 56 toward the connecting slot 53 and finally pass through the connecting slot 53 push against the electronic card 60, so as to connect and output the signal that the electronic card 60 has been inserted. The handheld portion 57 is continuously pushed, and the supporting plate 50 presses the resistant portion 421 of the slide block 42. Under this condition, the elastic element 41 gives the slide block 42 a reset power to move forward, and the supporting plate 50 is ejected an appropriate distance by the reset power of the slide block 42, thereby realizing the objective of the card ejection.

According to the above-mentioned, the front substrate 511 can swing up and down relative to the rear substrate 513 through the design of the supporting plate 50 and the swingable connecting portion 513, so that the electronic card can easily be inserted into and ejected from the card connector 1 without damage, thereby prolong the service life of the electronic card.

What is claimed is:

1. A card connector for coupling to an electronic card, comprising:
    an insulative body having a main body, a plurality of terminal slots defined in the main body;
    a plurality of conductive terminals respectively received in the terminal slots;
    a metal shell covering the insulative body, a receiving space being defined between the metal shell and the insulative body; and
    a supporting plate movably disposed in the receiving space of the insulative body, the supporting plate having a substrate, the substrate comprising a front substrate, a rear substrate, a swingable connecting portion coupled to the front substrate and the rear substrate, and a handheld portion extending from a front end of the front substrate, wherein a base slot is defined in a middle of an upper surface of the front substrate for receiving the electronic card, and a connecting slot which penetrates the substrate is defined in a middle of the base slot; wherein the front substrate can swing up and down relative to the rear substrate through the design of the swingable connecting portion.

2. The card connector of claim 1, wherein a lower surface of the rear substrate sinks to form a plurality of leading portions.

3. The card connector of claim 1, further comprising two card ejection mechanisms, wherein two receiving recesses are respectively defined in right and left sides of a back of the insulative body, and the two card ejection mechanisms are slidably disposed in the two receiving recesses respectively.

4. The card connector of claim 1, wherein the conductive terminal comprises a base portion, and one side of the base portion extends and bends toward an upper surface of the insulative body to form a curved contacting portion, whereby the contacting portion passes through the connecting slot and pushes against the electronic card.

5. The card connector of claim 1, wherein the metal shell has a shield plate, an elastic sheet disposed on the shield plate, an end of the elastic sheet bending downwards and extending obliquely upward to form an engage portion, and wherein a holding groove is disposed on the rear substrate of the supporting plate, whereby the engage portion of the elastic sheet is capable of engaging with the holding groove.

* * * * *